Sept. 12, 1939.　　　　J. T. MAY　　　　2,172,764
NURSERY CULTIVATOR
Filed Feb. 10, 1939
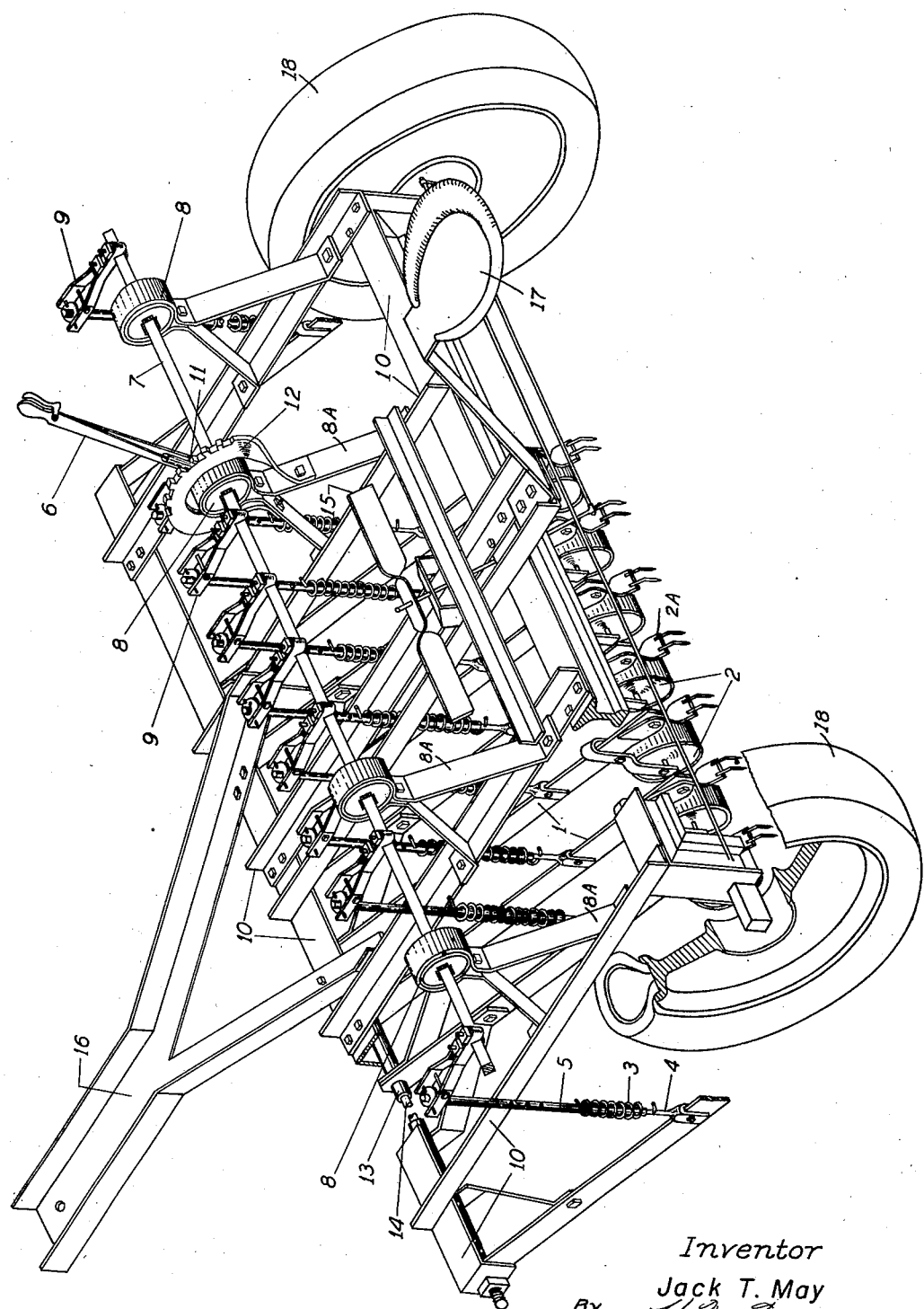
Inventor
Jack T. May
By
Attorneys Patented Sept. 12, 1939

2,172,764

UNITED STATES PATENT OFFICE 2,172,764

NURSERY CULTIVATOR

Jack Truett May, Brooklyn, Miss.; dedicated to the free use of the People in the territory of the United States Application February 10, 1939, Serial No. 255,692

1 Claim. (Cl. 97—145)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention relates to improvements in nursery cultivators particularly adaptable for use in cultivating forest tree seedlings or other plants growing in parallel rows.

The accompanying drawing is an isometric view of a nursery cultivator with some parts in section, illustrating my invention.

Referring with more particularity to said drawing, in which like numerals designate like parts, a rod 14 is mounted on the forward end of the frame 10 of the machine, upon which rod a tubular or sleeve shaft 13 is rotatably mounted. The forward end of each of a plurality of spaced cultivator arms 1 is attached to said sleeve shaft 13. A depth wheel 2 is attached below the lower end of each of said cultivator arms 1 and a cultivating shovel 2A is attached to the end of each cultivator arm, substantially as shown. The depth wheels 2 are for the purpose of regulating the depth of the cultivating shovels 2A. Each of said cultivator arms is attached to a vertical connecting rod 4, said connecting rod being slidably engaged in a sleeve shaft 5. One end of a compression spring 3 is attached to each member 5 and the other end of said spring to each connecting rod 4, respectively. The upper end of each sleeve shaft 5 is hinged to one end of a yoke lever 9, the other end of said yoke lever being secured to a horizontal shaft 7 operating in sleeve bearings 8, substantially as shown. Said bearings 8 are supported on brackets 8A attached to the frame of the machine, substantially as shown.

A lever 6 is attached to the shaft 7 and has a dog 11 operating on a ratchet 12. By this arrangement the shaft 7 may be rotated thereby elevating or lowering the cultivator arms 1, and the ratchet and dog assembly permit the maintenance of selective positions of the cultivator arms.

In front of the operator's seat 17, a foot steering lever 15 is mounted, said lever being attached to any suitable steering mechanism known in the art, which steering mechanism is adapted to actuate wheels 18, 18 on which the machine is hingedly mounted. The forward end of the machine is secured to a tongue 16 by means of which machine may be drawn.

Having thus described my invention, I claim:

In a nursery cultivator machine, a tubular horizontal shaft co-axially mounted on a rod secured to the frame of the machine; a plurality of spaced units, each unit comprising a cultivator arm normally sloping downward secured at its upper end to said tubular shaft, a depth wheel and a cultivating shovel secured to the lower end of said arm, a vertical connecting rod secured to said arm, slidably disposed in the lower end of a sleeve shaft, a compression spring connecting said sleeve shaft and said connecting rod, a yoke lever having one end hinged to the upper end of said sleeve shaft; a horizontal shaft mounted in sleeve bearings supported on brackets attached to the frame of said machine, means securing the ends of said yoke levers, opposite the ends hinged to the sleeve shafts, to said horizontal shaft; a hand operatable lever secured to said horizontal shaft; ratchet and dog means in combination with said lever for maintaining selective positions of said hand lever; a tongue for towing disposed on the forward end of said machine; wheels hinged to the rearward end of said machine for supporting it on the ground; and foot operated steering means for hingedly actuating said wheels.

JACK TRUETT MAY.